US011325711B2

(12) United States Patent
Ozaki et al.

(10) Patent No.: US 11,325,711 B2
(45) Date of Patent: May 10, 2022

(54) SEAT UNIT STRUCTURE, SEAT UNIT, AND ATTACHMENT METHOD THEREOF (71) Applicant: JAMCO CORPORATION, Mitaka (JP)

(72) Inventors: Masaji Ozaki, Mitaka (JP); Michihito Suzuki, Mitaka (JP)

(73) Assignee: JAMCO CORPORATION, Mitaka (JP)

( * ) Notice: Subject to any disclaimer, the term of this patent is extended or adjusted under 35 U.S.C. 154(b) by 187 days.

(21) Appl. No.: 16/500,255

(22) PCT Filed: Dec. 18, 2017

(86) PCT No.: PCT/JP2017/045275
§ 371 (c)(1),
(2) Date: Oct. 2, 2019

(87) PCT Pub. No.: WO2018/185979
PCT Pub. Date: Oct. 11, 2018

(65) Prior Publication Data
US 2021/0114735 A1 Apr. 22, 2021

(30) Foreign Application Priority Data

Apr. 3, 2017 (JP) .............................. JP2017-073604

(51) Int. Cl.
*B60N 2/06* (2006.01)
*B64D 11/06* (2006.01)

(52) U.S. Cl.
CPC ...... *B64D 11/0649* (2014.12); *B64D 11/0624* (2014.12); *B64D 11/0627* (2014.12); *B64D 11/0643* (2014.12); *B64D 11/0696* (2013.01)

(58) Field of Classification Search
CPC .................................................. B64D 11/0696
See application file for complete search history.

(56) References Cited

U.S. PATENT DOCUMENTS 5,857,745 A 1/1999 Matsumiya
2004/0232283 A1 11/2004 Ferry et al.
(Continued)

FOREIGN PATENT DOCUMENTS

CA 2704897 A1 * 3/2011 ......... B64D 11/0696
JP 10-80341 A 3/1998
(Continued)

OTHER PUBLICATIONS

International Search Report dated Jan. 30, 2018, issued in counterpart International Application No. PCT/JP2017/045275 (2 pages).
(Continued)

*Primary Examiner* — Timothy J Brindley
(74) *Attorney, Agent, or Firm* — Westerman, Hattori, Daniels & Adrian, LLP (57) ABSTRACT An object of the present invention is to provide a seat unit structure, a seat unit, and an attachment method thereof in which component reinstallation does not arise when the seat unit is attached in an aircraft. One representative seat unit structure according to the present invention relates to a seat unit structure configured to support a seat, wherein the
(Continued)

structure has a lower structure having a monocoque structure and defines an outermost shell in at least one direction of the seat unit. That is, the member mounted in the one direction of the seat unit can be stored inside the outermost shell of the structure. In addition, the one direction is the width direction of the airframe.

10 Claims, 12 Drawing Sheets

(56) References Cited

U.S. PATENT DOCUMENTS

| | | | |
|---|---|---|---|
| 2005/0173608 A1* | 8/2005 | Lory | B60P 7/0815 |
| | | | 248/418 |
| 2006/0163917 A1 | 7/2006 | Schroeder et al. | |
| 2006/0170261 A1 | 8/2006 | Baatz et al. | |
| 2007/0164157 A1 | 7/2007 | Park | |
| 2008/0088166 A1* | 4/2008 | Gardiner | B64D 11/064 |
| | | | 297/344.14 |
| 2008/0290715 A1 | 11/2008 | Fullerton et al. | |
| 2011/0101165 A1 | 5/2011 | Fullerton et al. | |
| 2012/0138744 A1 | 6/2012 | Fullerton et al. | |
| 2014/0159440 A1 | 6/2014 | Porter | |
| 2018/0281971 A1* | 10/2018 | Sankrithi | B64C 1/18 |
| 2019/0127071 A1* | 5/2019 | Zheng | B64D 11/0643 |
| 2020/0001752 A1* | 1/2020 | Metten | B64D 11/0696 |
| 2020/0180769 A1* | 6/2020 | Doughty | B60N 2/01575 |

FOREIGN PATENT DOCUMENTS

| | | |
|---|---|---|
| JP | 2004-537459 A | 12/2004 |
| JP | 2007-524542 A | 8/2007 |
| JP | 2008-521703 A | 6/2008 |
| JP | 2010-527835 A | 8/2010 |
| JP | 2014-162479 A | 9/2014 |
| JP | 2016-529148 A | 9/2016 |
| WO | 03/013903 A1 | 2/2003 |
| WO | 2006/059118 A1 | 6/2006 |
| WO | 2012/169906 A1 | 12/2012 |
| WO | WO-2018185978 A1 * | 10/2018 ......... B64D 11/0606 |
| WO | WO-2018185979 A1 * | 10/2018 ......... B64D 11/0601 |

OTHER PUBLICATIONS

Written Opinion (Form PCT/ISA/237) of the International Searching Authority dated Jan. 30, 2018, issued in counterpart International Application No. PCT/JP2017/045275 (5 pages).

Extended (Supplementary) European Search Report dated Dec. 8, 2020, issued in counterpart EP Application No. 17904531.5. (8 pages).

* cited by examiner

SEAT UNIT STRUCTURE, SEAT UNIT, AND ATTACHMENT METHOD THEREOF

TECHNICAL FIELD

The present invention relates to a seat unit structure, a seat unit, and an attachment method thereof.

BACKGROUND ART

In recent aircraft design, there is demand to reduce the weight of aircraft structures, secure freedom in seat arrangements, and simplify the installation of aircraft equipment such as seat units. If weight reduction of the aircraft structure and an increase in the degree of freedom of seat arrangements can be achieved, the number of passengers that can be carried by the aircraft can be increased accordingly, and the potential profitability of the aircraft can be increased.

In addition, if the installation of aircraft equipment can be simplified, the time required for aircraft manufacturing can be shortened, and at the same time, the manufacturing cost can be reduced.

In Patent Document 1, there is described a seat assembly comprising an integral composite frame and a comfort frame assembly connected to the composite frame that is provided for each passenger. By using an integrated composite frame, the passenger seat can be formed to be compact and lightweight with a small number of parts. Furthermore, this passenger seat can achieve the safety structural specifications required for aircraft seats.

When installing this seat assembly in an aircraft, a two-step installation procedure can be carried out in which the composite structure frame is first installed on the aircraft airframe, and the comfort frame assembly is next placed on the composite structure frame.

CITATION LIST

Patent Literature

[Patent Document 1] Japanese Translation of PCT International Application Publication No. 2010-527835

SUMMARY OF INVENTION

Technical Problem

For safety reasons, regulations have been made by law with regard to the aisle width between the seats in an aircraft. In the two-stage installation procedure described in Patent Document 1, a comfort frame assembly such as a headrest or an armrest, which are types of seat components, are sequentially attached to a composite structure frame to complete a seat unit, and this seat unit is installed in an aircraft. For this reason, after the operator installs all the seat components in the aircraft, it is necessary for the final inspector of the installation work to measure the aisle width between the seats and verify that the statutory aisle width is complied with.

Such a seat component attachment method and aisle width verification operation are not limited to cases in which the composite structure frame is used, and the same applies to seat units assembled using metal columnar frames.

For this reason, in the case that an installation error by an operator or an irregularity in component shape occurs with respect to a seat component, there are times when the statutory aisle width cannot be complied with. In such a case, in order to secure the statutory aisle width, it is necessary to reinstall the seat components. In addition, such legal restrictions apply to the window side as well as the center of the airframe. As a result, the time required for manufacturing the aircraft only becomes known after the seats have been installed on the airframe, resulting in difficulty planning production schedules and leading to an increase in manufacturing costs.

Accordingly, an object of the present invention is to provide a seat unit structure, a seat unit, and an attachment method thereof in which reinstallation of seat components does not arise when the seat unit is attached to the aircraft.

Solution to Problem

In order to achieve the above-described object, one representative seat unit structure according to the present invention relates to a seat unit structure including a lower structure having a bottom surface portion and an upper shell installed above the lower structure, wherein the seat unit structure defines an outermost shell of the seat unit in at least one direction of the seat unit, and the lower structure connects and fixes the seat unit to a mobile body at the bottom surface portion.

Advantageous Effects of Invention

According to the present invention, since the dimensions are guaranteed when the seats are manufactured at the factory, seat component reinstallation does not arise when the seat units are attached in the aircraft. For this reason, it is possible to shorten the time required for aircraft manufacturing and to carry out production as planned, thereby reducing manufacturing costs.

Problems, configurations, and effects other than those described above will be made clear by the description of the embodiments below.

DESCRIPTION OF EMBODIMENT(S)

Figure 1:
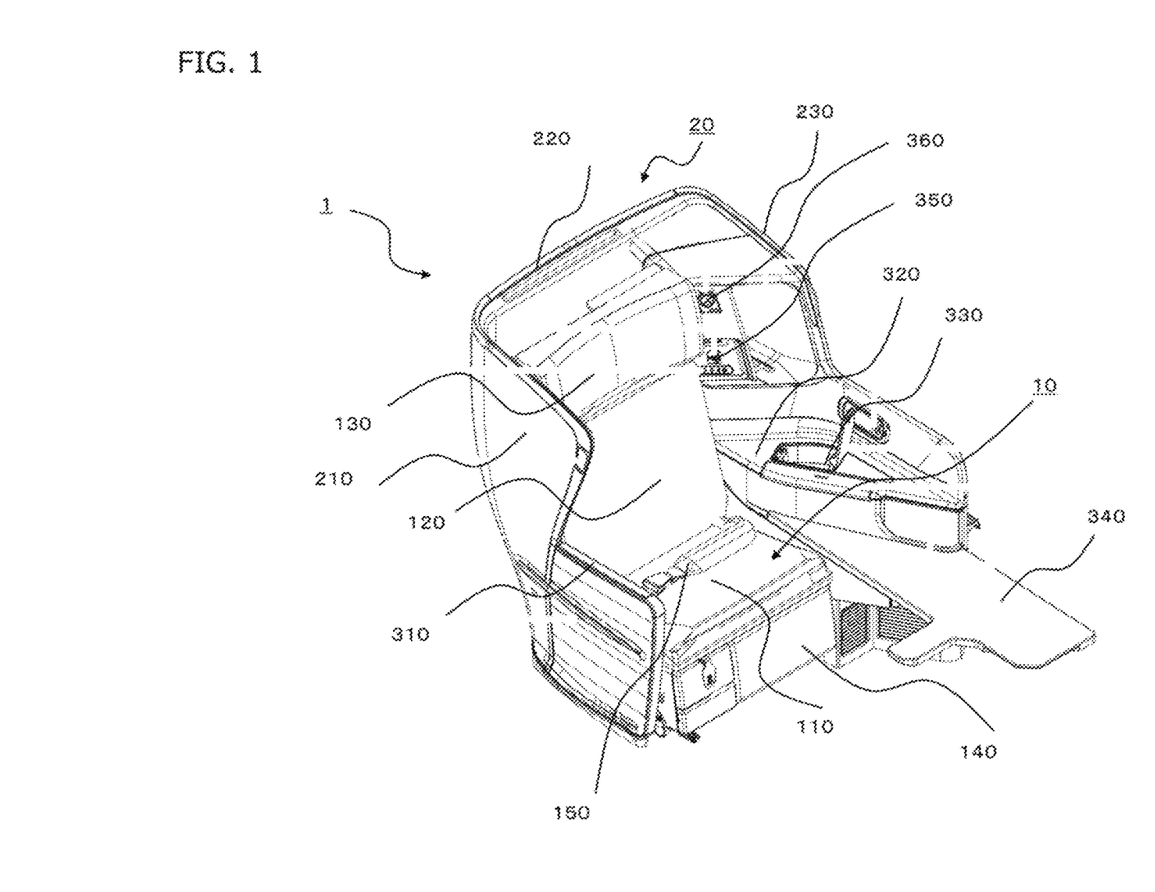
FIG. 1 is a front perspective view of a general seat unit

First, a general seat unit will be described. FIG. 1 is a perspective view from the forward direction of a seat unit for business class or first class that is disposed in the cabin of an aircraft. The seat unit 1 has a structure in which the seat 10 is surrounded by a shell 20, and in this Figure, equipment used by a passenger (such as a reading light 360) is also depicted.

The seat 10 includes a lower seat 110, an upper seat 120, a headrest 130, and a leg rest 140. The lower seat 110 is also referred to as a seating portion, and the upper seat 120 is also referred to as a backrest. A seat belt 150 is attached to the seat.

The shell 20 includes a right side shell 210 on the right side of the seat 10, a rear side shell 220 on the rear side of the seat 10, and a left side shell 230 on the left side of the seat 10.

The seat unit 1 further includes various equipment. On the right side of the seat 10, a right armrest portion 310 is provided. On the left side of the seat 10, a left armrest portion 320 is provided. The left armrest portion 320 is provided with an openable/closable storage box 330. An ottoman 340 is disposed in front of the left armrest portion 320.

Further, between the headrest 130 and the left side shell 230, one or more jacks 350 for electronic devices and a reading light 360 are disposed.

Also, these seat units are completed by attaching the various seat components as described above around a basic frame formed from metal or resin.

Figure 2:
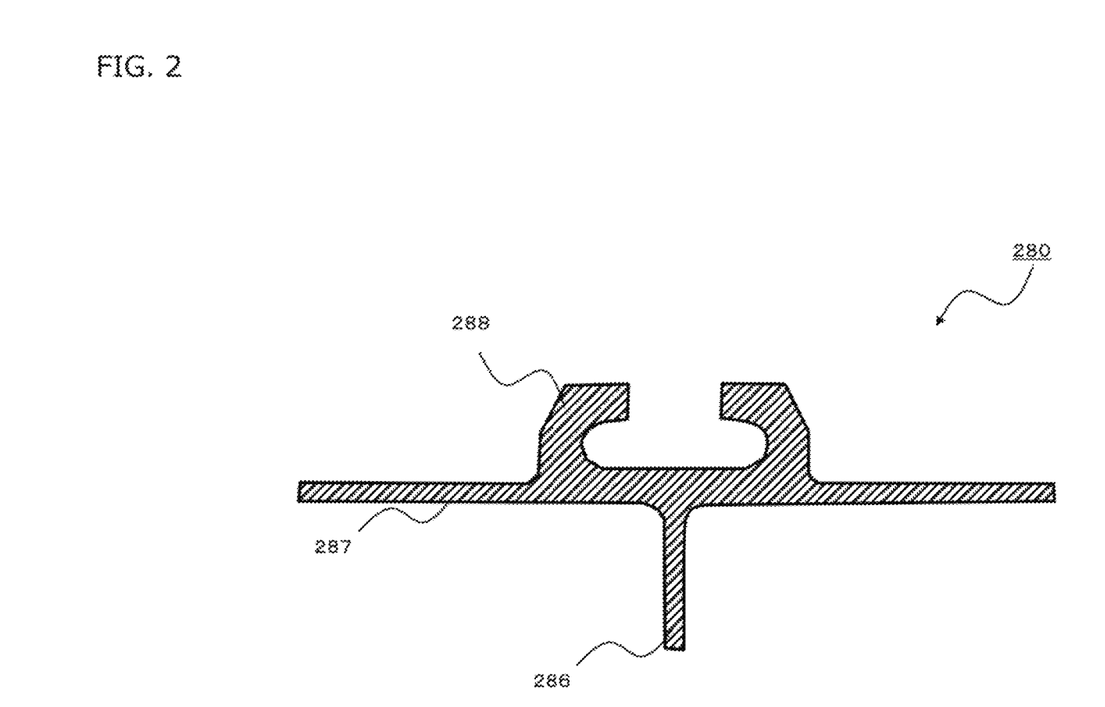
FIG. 2 is a cross-sectional view of a seat track.

On the airframe of the aircraft, a seat track, as illustrated in cross section in FIG. 2, is inserted into the floor of the airframe along the longitudinal direction of the aircraft.

As illustrated in FIG. 2, the seat track 280 includes an underfloor structure 286 that serves as a structural component under the floor of the aircraft airframe, a flat portion 287 that supports the floor plate, and a seat track side fitting portion 288.

Figure 3:
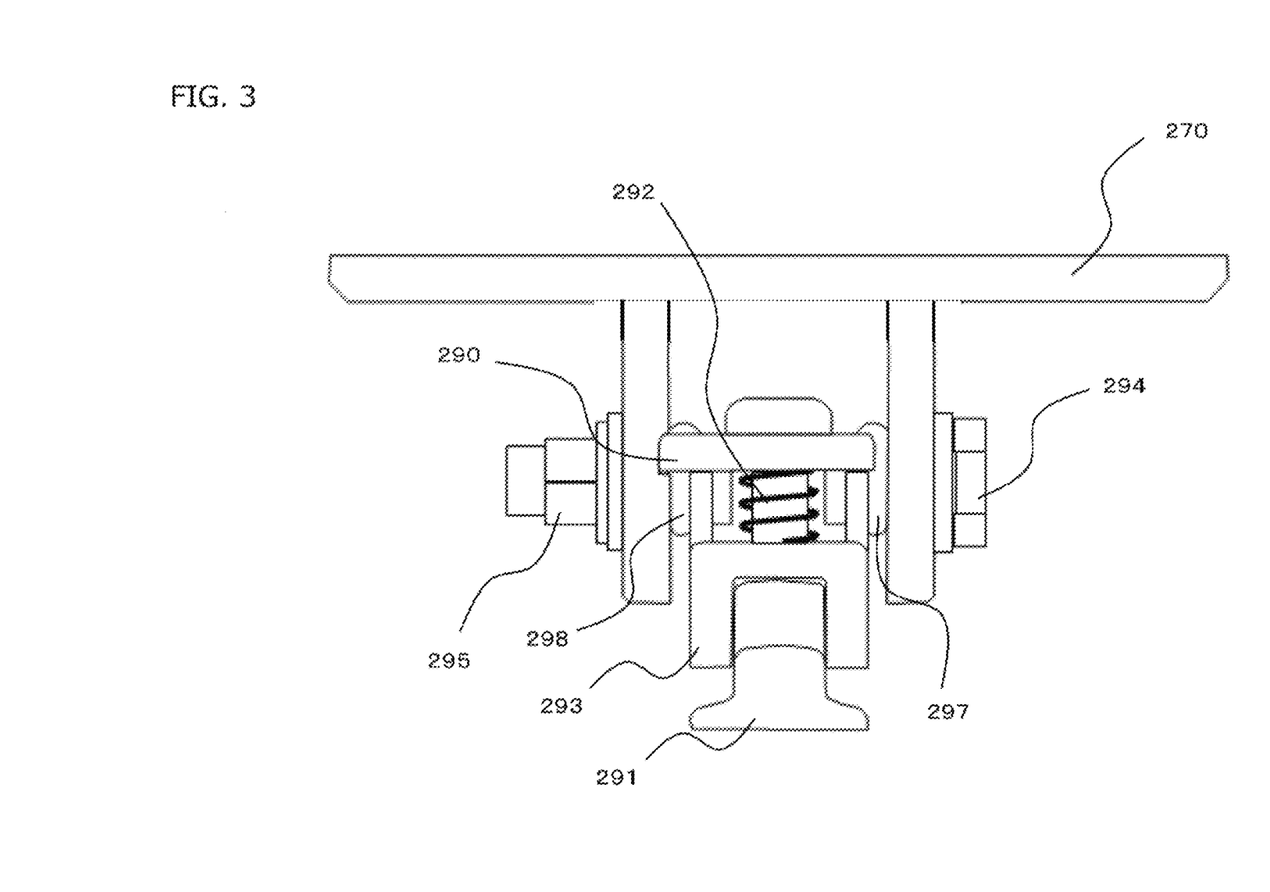
FIG. 3 is an enlarged view around a track fitting member.

Further, the leg portions of the basic frame of the seat unit are fixed to the seat track by a track fitting member as illustrated in FIG. 3. Here, conventionally, four track fitting members would be disposed under the four front, rear, left, and right legs of the basic frame of the seat unit, and be fixed to the two rows of seat tracks.

FIG. 3 is an enlarged view around the track fitting member. The fixture 270 is also referred to as a fitting bracket and is fixed to the seat track 280. The fitting portion 291 on the fitting side is fixed to the fitting portion 288 on the seat track side.

The track fitting member 290 is provided with a bolt 294 and a nut 295 for pressing the plunger 293 downward by a vertical spring 292, assuming the load on the front and rear of the airframe, and fixing the fixture 270. In addition, a lateral spring 296 is provided to prevent shifting when a margin is provided to allow for deviation in the distance between the pair of left and right track fittings. In addition, a right side buffer member 297 and a left side buffer member 298 are attached between the track fitting member 290 and the fixture 270. The right buffer member 297 and the left buffer member 298 are provided with holes through which the externally threaded portion of the bolt 294 passes.

For this reason, various seat components are attached to the basic frame fixed to the airframe of the aircraft. That is, in the example illustrated in FIG. 1, the right side shell 210 and the right armrest 310 are attached to the right side of the seat unit in the direction from the basic frame to the aisle side.

As a result, even in the case that the basic frame is fixed to the aircraft as designed, if the right side shell 210 or the right armrest 310 is not installed as designed, there are cases in which the aisle width on the right side of the seat unit does not satisfy the statutory aisle width.

First Embodiment

Figure 4:
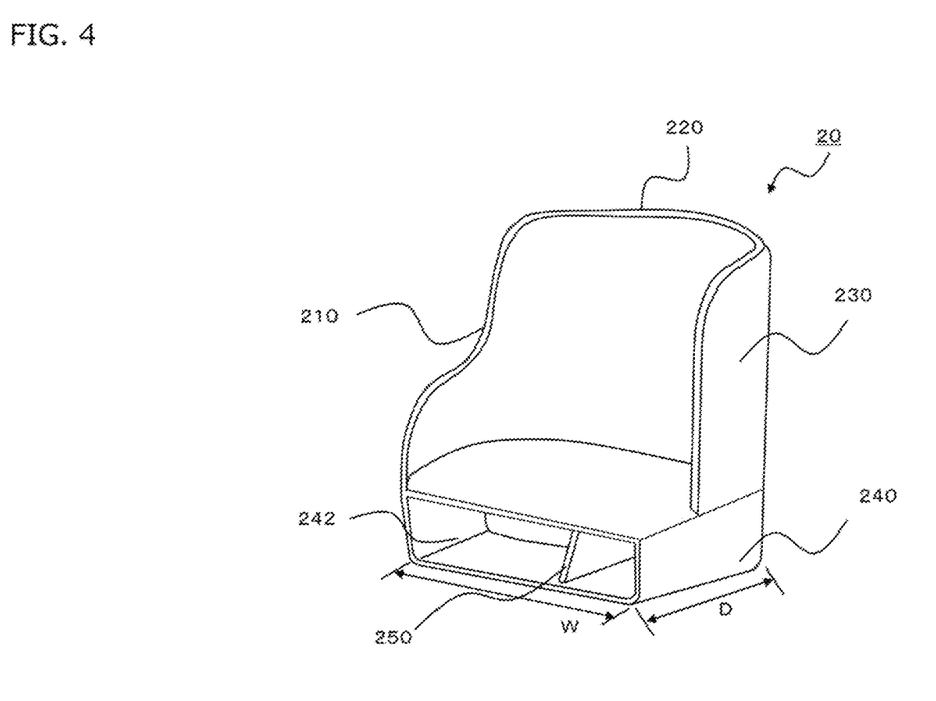
FIG. 4 is a front perspective view of a seat unit structure according to the first embodiment.

FIG. 4 is a front perspective view of a seat unit structure according to the first embodiment. The seat unit structure (hereinafter also referred to as "shell 20") has a shell structure in which a lower structure and an upper shell are combined, and defines the outermost shell of the seat unit. In addition, the seat unit structure is capable of supporting a seat in the inner region of the outermost shell, and is fixed to the aircraft airframe at its bottom.

Configuration

In FIG. 4, the shell 20 is configured by adding an upper shell consisting of a right side shell 210, a rear side shell 220, and a left side shell 230 as separate members above a seat base 240 that serves as the lower structure of the seat unit. The shell 20 is connected and fixed to the aircraft at the bottom of the seat base 240.

The seat base 240, which serves as the lower structure of the seat unit, is formed in a hollow box shape using integrally formed members. Here, specifically, the integrally formed members are members formed from thermoplastic resins such as polyetherimide or polyetherketoneketone, thermosetting resins capable of appropriately controlling flammability, or composite materials such as carbon graphite fiber, glass fiber, or aramid fiber, and are composite members that contain a core material such as foam or honeycomb. Such an integrally formed composite member can form a solid three-dimensional shape without using connection parts such as bolts and nuts. Furthermore, since the integrally formed composite member is formed from the above-described composite materials, the locations that perform anticorrosion processes can be significantly reduced in comparison with the structural members formed from conventional metals.

In addition, the hollow box structure refers to a cylindrical structural shape, which is also known as a monocoque structure. Accordingly, the seat base 240 can support the load of the seat, the passenger, and the equipment used by the passenger (such as the reading light 360).

The hollow region 242 of the seat base 240 is rectangular when viewed from the front of the seat, but may have a quadrilateral shape, such as a trapezoid. In addition, the thickness of the seat base 240, that is, the thickness of the members constituting the lower structure of the seat, are approximately 10 mm to 15 mm.

With such a seat base 240, there is no concept of a column-like support or leg portion for supporting the leg of one seat, the position of which is restricted by the position of the seat track on the airframe side. Accordingly, regardless of the shape of the upper structure of the seat, a common structure can be adopted for seats of various sizes and shapes. In addition, since the installation of electric devices and the arrangement of the wiring associated therewith are not restricted by the position of the leg portion, the degree of freedom and commonality in design can be expanded.

In addition, a partition member 250 can be disposed in the hollow region 242. Since the seat base 240 has a hollow monocoque structure, the partition member 250 (sometimes referred to as a partition plate) need not support the load of a passenger or the like, and can freely move within the hollow region 242.

The seat unit structure (shell 20) defines the outermost shell of the seat unit and at the same time also defines the width of the aisle adjacent to the seat unit. For this reason, as a requirement of the aisle width, in the case that the aisle width at a height near the floor is set to be wide, an upper shell consisting of the right side shell 210, the rear side shell 220 and the left side shell 230 may be designed for placement on the seat base 240 without protruding from the seat base 240. For example, in FIG. 4, the maximum width dimension W and the maximum depth dimension D of the shell 20 coincide with the maximum width dimension and the maximum depth dimension of the seat base 240.

In contrast, in cases where it is not necessary to set the aisle width to be wide near the floor, or in cases where the upper shell is provided with a bulging shape, the maximum width dimension of the upper shell may be set to be larger than the maximum width dimension of the seat base 240. In these cases, however, it should be noted that the maximum width dimension W and the maximum depth dimension D of the shell 20 do not coincide with the maximum width dimension and the maximum depth dimension of the seat base 240.

In addition, the upper shell illustrated in FIG. 4 depicts an example in the case of business class or first class, and is configured as a side shell for maintaining privacy by blocking the line of sight between seated passengers. On the other hand, although not illustrated in the Figures, in the case of the economy class, the right side shell 210 and the left side shell 230 are provided with a height of approximately armrest level.

It should be noted that the expression "defines the outermost shell of the seat unit" refers to a state in which all the components of the seat unit are accommodated in the inner region of the seat unit structure (shell 20) in one specific direction in a horizontal plane.

Figure 5:
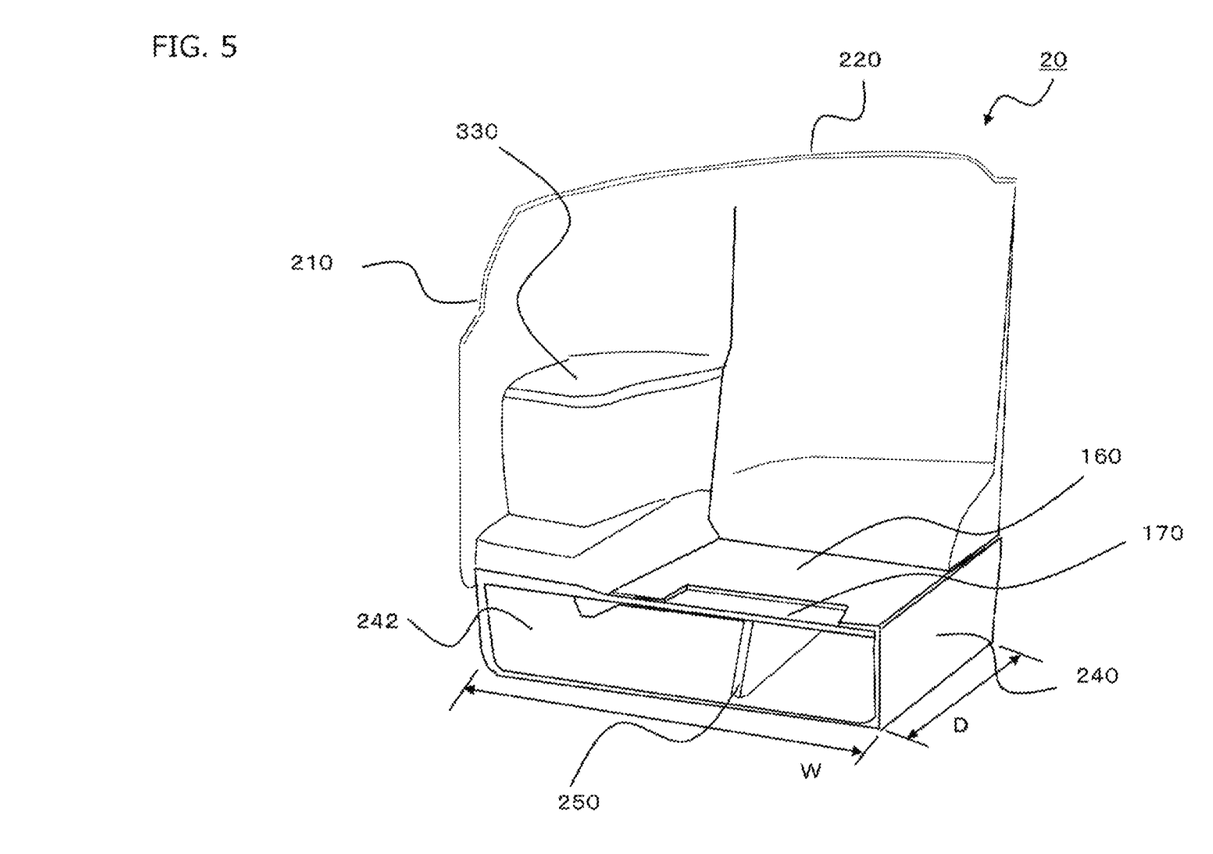
FIG. 5 is a front perspective view of a shell structure according to the first embodiment.

FIG. 5 is a perspective view of the shell structure according to the first embodiment as viewed obliquely from the front, and illustrates a state prior to attachment of the seat 10. An upper seat support structure 160 for supporting the upper seat 120 of the seat 10 is disposed on the seat base 240. In addition, a storage box 330 that serves as both a console and a leg space for the rear seat is disposed to the right of the upper seat support structure 160.

It is also possible to further provide a local reinforcing member 170 on the upper surface of the seat base 240 where the seat 10 is mounted.

Accordingly, even in the case that the storage box 330 and the reinforcing member 170 are disposed inside the shell structure, they are all disposed in the region inside the shell 20.

Figure 6:
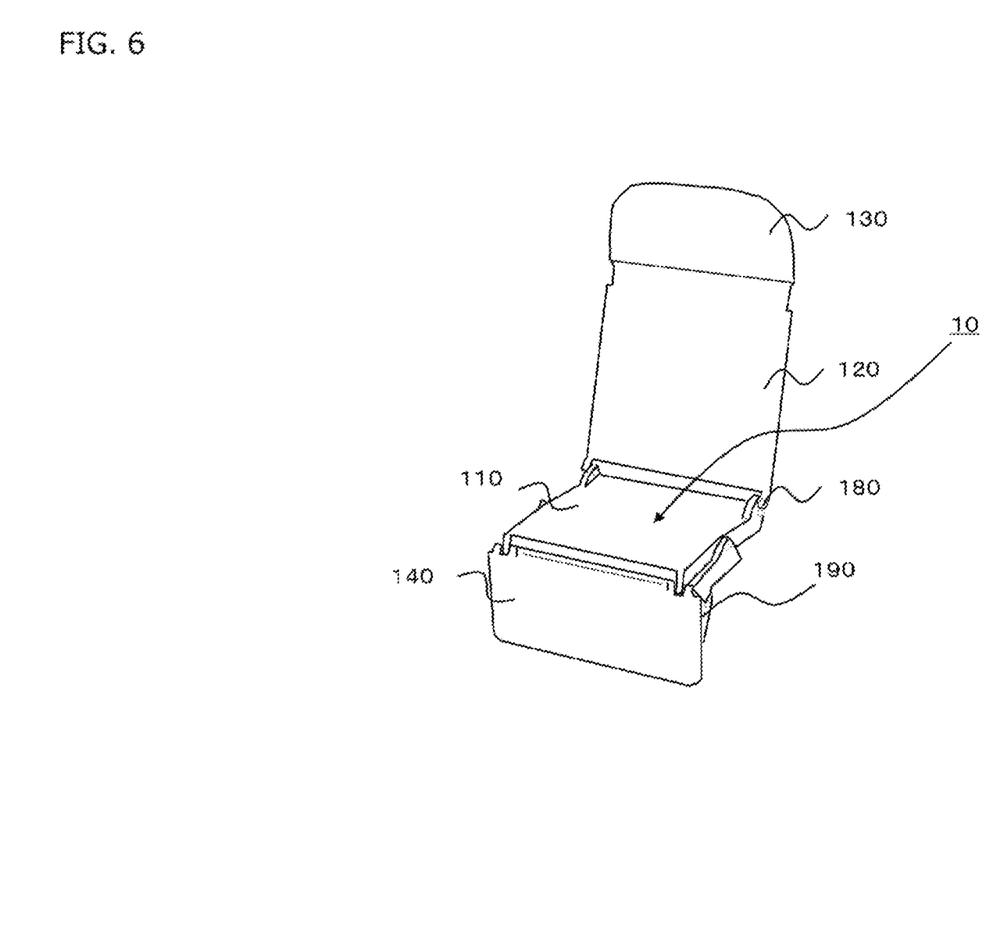
FIG. 6 is a front perspective view of a seat used in the first embodiment.

FIG. 6 is a perspective view of an example of a seat used in the first embodiment as viewed obliquely from the front. The seat 10 includes a lower seat 110 on which a passenger sits, an upper seat 120 to serve as a backrest, a headrest 1130 that is a pillow-like portion on the upper part of the backrest and allows passengers to rest their head and neck, and a leg rest 140 for passengers to rest their legs and reduce fatigue on their calves or the like.

The seat reclining mechanism 180 is a mechanism that tilts the upper seat 120 rearward. The foot reclining mechanism 190 is a mechanism that rotates the leg rest 140 so as to lift it toward the surface of the lower seat 110.

Figure 7:
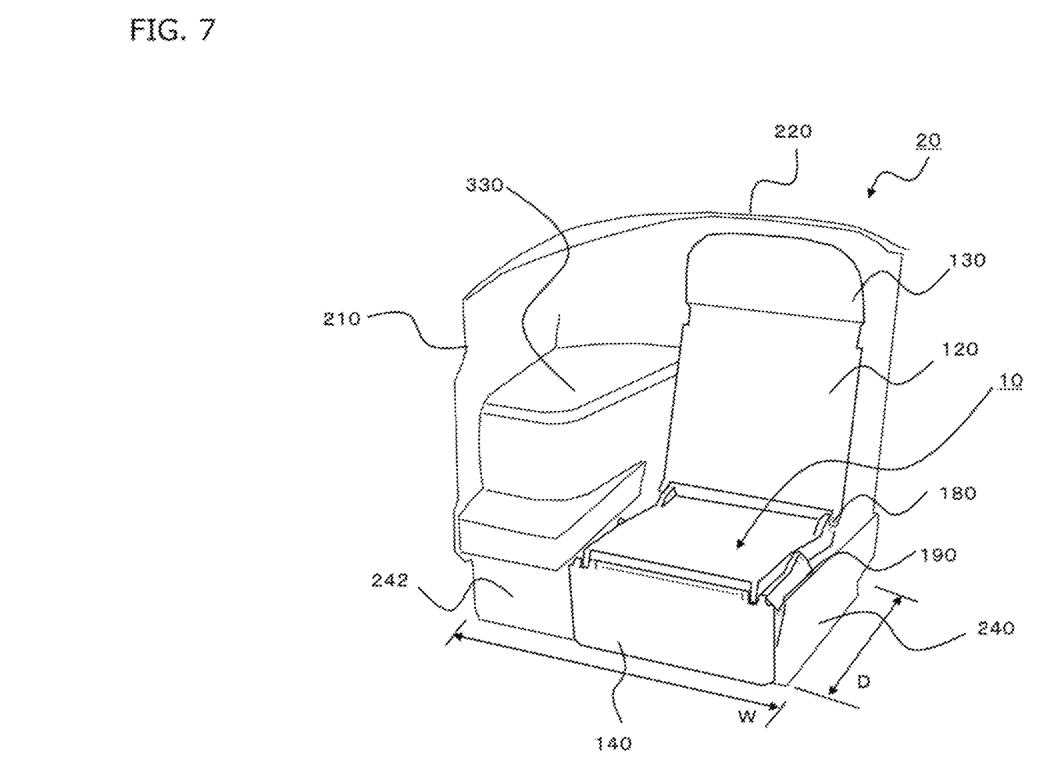
FIG. 7 is a front perspective view of a seat unit according to the first embodiment.

FIG. 7 is a perspective view of a configuration in which the seat 10 described with reference to FIG. 7 is placed on the shell 20 described with reference to FIG. 5, as viewed obliquely from the front.

Here, since the leg rest 140 protrudes forward from the shell 20, the depth dimension of the seat unit 1 is larger than the maximum depth dimension D of the shell 20. However, since the front of the seat unit 1 is the space for passengers to place their legs, and it is not governed by laws such as the aisle width between seats, it is sufficient to maintain a width that is enough to permit evacuation in the case of emergencies.

In contrast, since all of the seat components are disposed in the region inside the width direction of the shell 20, the width dimension of the seat unit 1 is the same as the maximum width dimension W of the shell 20. That is, even after all the seat components are installed in the shell 20 in the aircraft, the width dimension of the seat unit 1 is fixed by the maximum width dimension W of the shell 20, and does not change as a result of installing the seat components.

It should be noted that, in FIG. 7, even when the right side shell 210 has a side surface on the window side, all of the equipment, such as a cosmetic mirror, a side table, or the like, can be attached in the inner region of the shell 20. That is, all of the attachable members that can be used by the person sitting in the seat unit can be stored at least inside the outermost shell of the shell 20.

Figure 8:
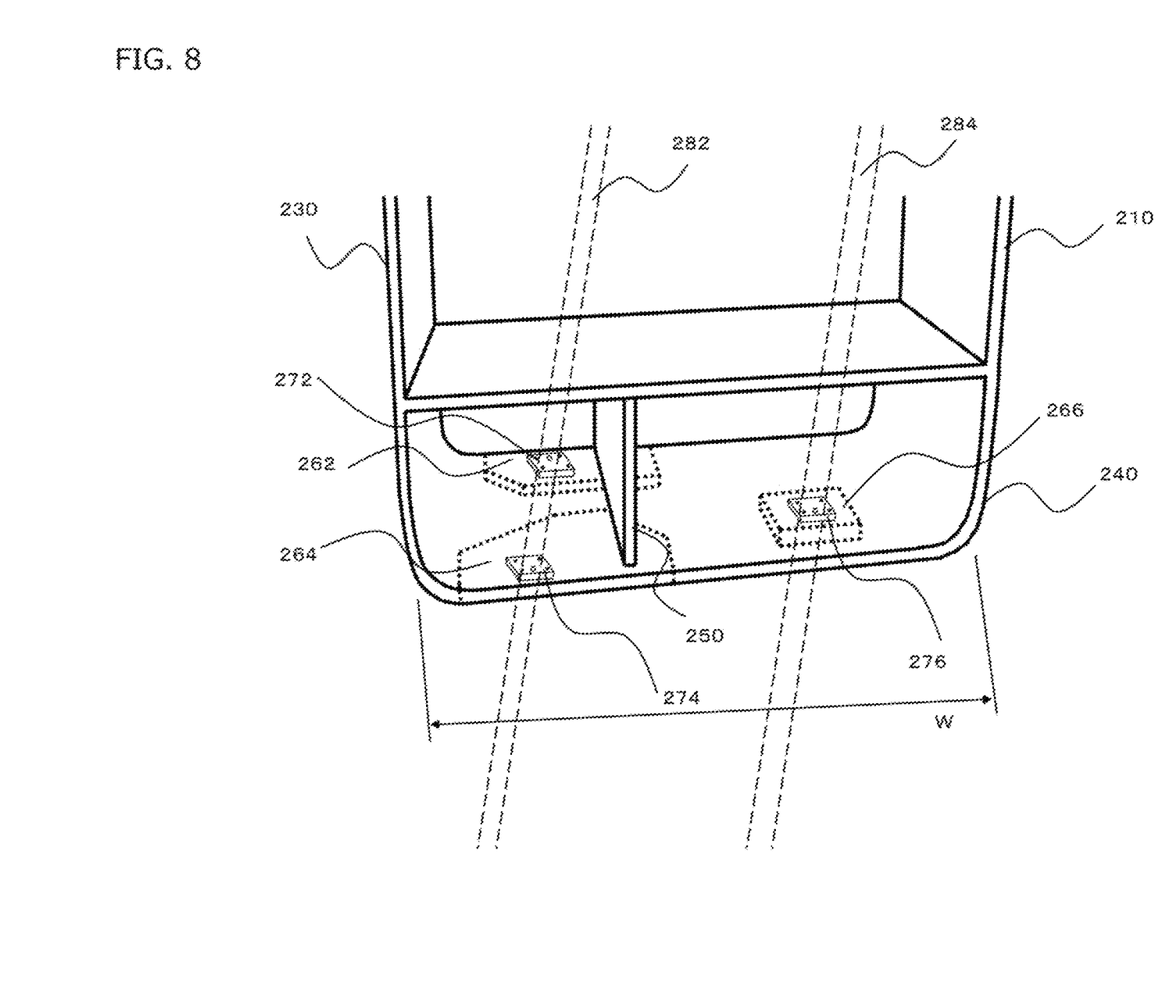
FIG. 8 is a rear perspective view of a seat base according to the first embodiment.

FIG. 8 is a perspective view of a seat base which is a lower structure of the seat unit according to the second embodiment as viewed obliquely from the rear. The shell 20 omits the back shell 220 for convenience of describing the seat track and illustrates the right side shell 210 and the left side shell 230.

The first seat track 282 and the second seat track 284 constitute a pair of seat tracks and extend on the floor in the longitudinal direction of the aircraft airframe. In the aircraft, by fixing the bottom of the seat unit 1 (the bottom of the seat base 240 in FIG. 8) to the pair of seat tracks, the seat unit 1 is attached to the aircraft airframe, and it is necessary for this seat unit 1 to pass a predetermined dynamic load test to ensure passenger safety. In FIG. 8, a state is depicted in which the seat base 240 is disposed slightly leftward with respect to the longitudinal direction of the aircraft airframe. For this reason, the seat base 240 does not squarely face the first seat track 282 and the second seat track 284, but faces slightly to the left.

At the bottom of the seat base 240, three mounting blocks are inserted (the mounting blocks are shown with dotted lines). The seat base 240 is secured to the three fixtures for attachment to the aircraft airframe via the three mounting blocks. Since the seat base 240 has a monocoque structure and does not have columnar legs, mounting blocks are provided at the bottom of the seat base 240 and reinforce the connection between the fixture and the seat base 240. The material of the mounting block is preferably made of metal or the like, but the material is not limited as long as it is a reinforcing block.

In FIG. 8, in order to attach the seat base 240 to the aircraft airframe in three locations, the first mounting block 262 is arranged in front of the bottom of the seat base 240 and the second mounting block 264 is arranged behind it. The third mounting block 266 is arranged on the right side.

Below each mounting block, the fixtures for the seat track are respectively arranged (the fixtures are indicated by solid lines). That is, a first fixture 272 is disposed below the first mounting block 262 and is attached to the first seat track 282. A second fixture 274 is disposed below the second mounting block 264 and is mounted to the first seat track 282 at a point separated from the first fixture 272.

In addition, a third fixture 276 is disposed below the third mounting block 266 and is attached to the second seat track 284 at a corresponding location between the first fixture 272 and the second fixture 274. Preferably, the third fixture 276 is mounted approximately at the center of a corresponding location between the first fixture 272 and the second fixture 274.

Figure 9:
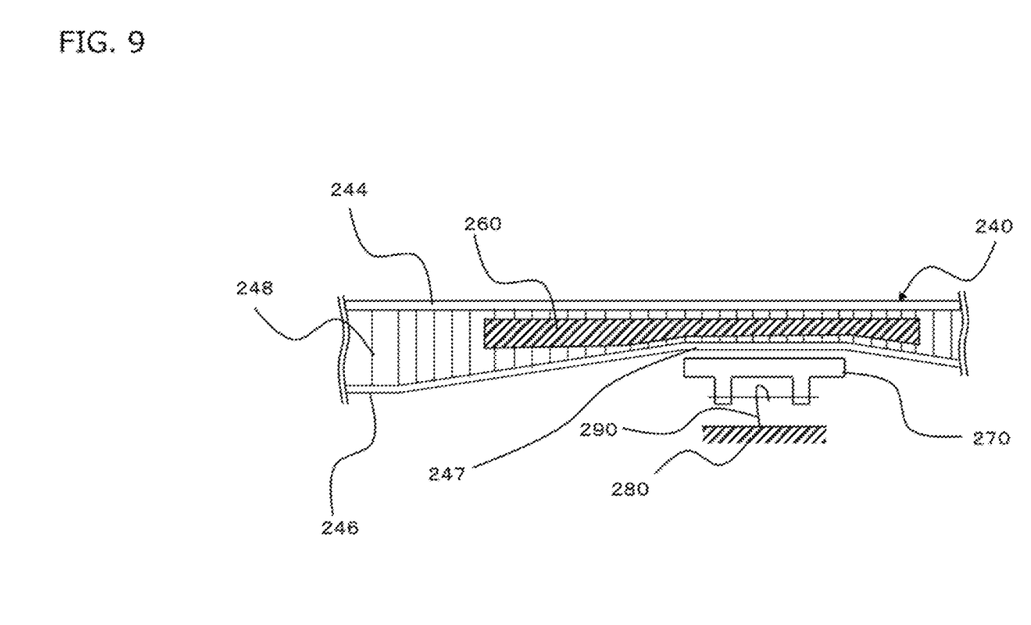
FIG. 9 is an enlarged view around the bottom of a seat base according to the first embodiment.

Incidentally, FIG. 9 is an enlarged view around the bottom of the seat base 240 according to the first embodiment. The bottom of the seat base 240 forms a honeycomb structure 248 between the inner surface 244 on the hollow region 242 side and the opposite outer surface 246. In the honeycomb structure 248, a mounting block 260 is disposed. The mounting block 260 and the fixture 270 are fixed by bolts and nuts or the like. The material of the inner surface 244 and the outer surface 246 is, for example, a composite fiber of resin and fiber. The material of the honeycomb structure 248 is, for example, a composite fiber of noncombustible paper and phenol resin.

The thickness of the mounting block 260 below which the fixture 270 is disposed is reduced. The thickness of the bottom of the seat base 240, below which the fixture 270 is arranged, is similarly reduced. By making the bottom of the seat base 240 and a portion of the mounting block 260 thin in this way and providing the recess 247, the inner surface 44 of the seat base 240 can be kept flat, which is convenient for passengers to place their legs and store luggage in the hollow region 242.

Accordingly, by fixing the seat base 240 to the pair of seat tracks using the three fixtures, the seat base 240 can be attached in a manner that does not squarely face the seat track. As a result, the degree of freedom in the arrangement of the seats in the aircraft can be greatly increased.

FIG. 8 will be described once more. The first seat track 282 and the second seat track 284 extend on the floor in the longitudinal direction of the aircraft airframe. In addition, by utilizing the inclination angle of the seat base 240 and the maximum width dimension W of the seat base 240 with respect to the seat tracks 282 and 284, it is possible to unambiguously calculate the occupied width of the seat base 240 with respect to the vertical direction of the seat tracks 282 and 284 (that is, the width direction orthogonal to the longitudinal direction of the aircraft). This maximum occupied dimension (hereinafter referred to as a "corrected dimension") is set as W' (not illustrated in the Figures).

Figure 10:
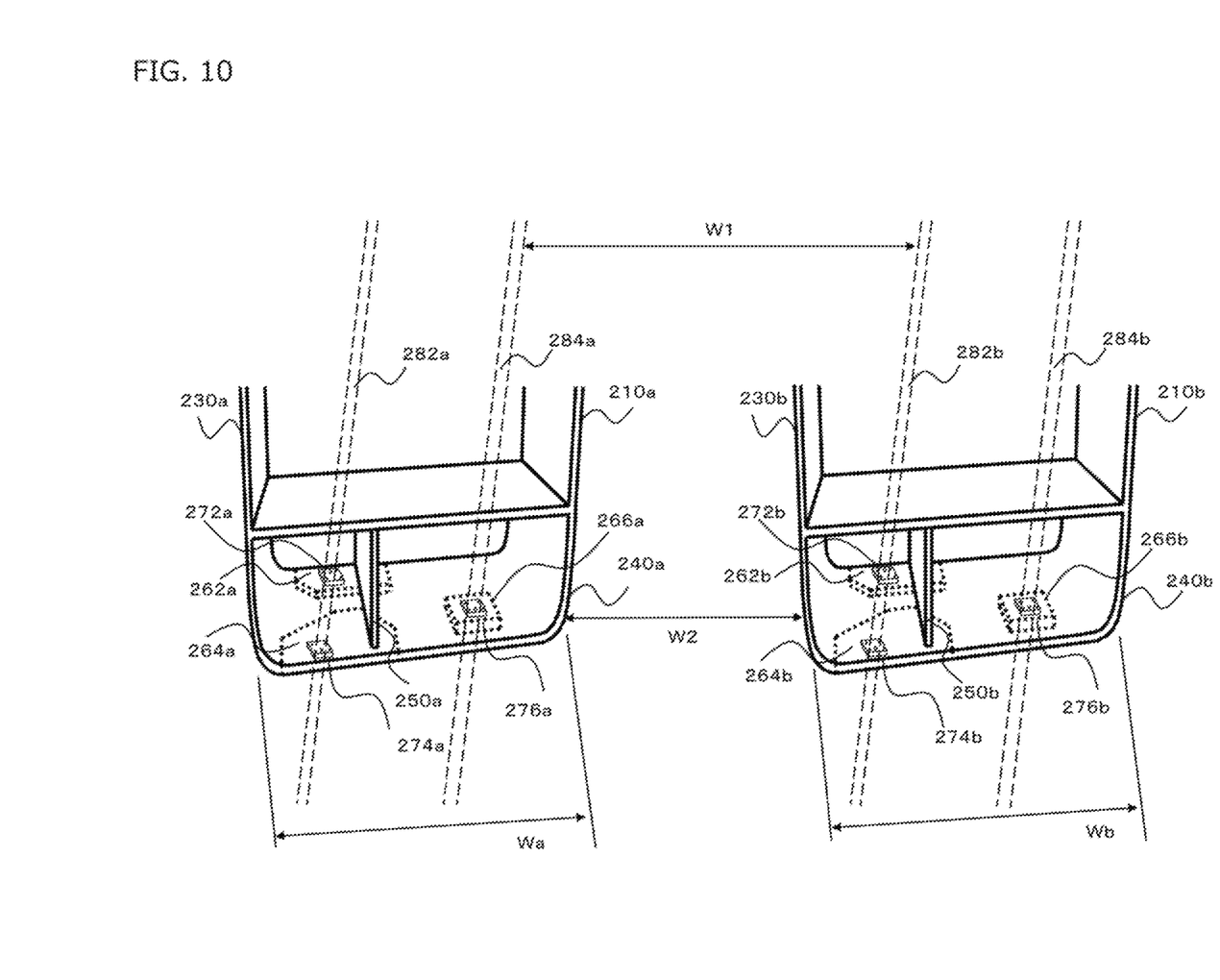
FIG. 10 is a diagram for explaining the intervals between seat bases according to the first embodiment.

FIG. 10 is a diagram for explaining the intervals between seat bases according to the first embodiment. Based on the maximum width dimension Wa of the seat base 240a, how large the maximum occupied dimension will be is calculated with respect to the vertical direction of the seat tracks 282a and 284a as described in FIG. 8, and the corrected dimension Wa' is obtained (not illustrated in the Figures). Similarly, the corrected dimension Wb' (not illustrated in the Figures) is obtained based on the maximum width dimension Wb of the seat base 240b.

Next, based on the structural design document for the airframe to which the seat base is to be attached, the dimension W1 between the seat tracks inside the two seat bases (between 284a and 282b) is determined. Then, if the measurement direction of the corrected dimension Wa' and the corrected dimension Wb' is included in the direction that defines the outermost shell of the seat unit, the interval W2, that is the interval between the two seat units, can be obtained from the positional relationship between W1, the corrected dimensions Wa' (not illustrated in the Figures) and Wb' (not illustrated in the Figures), and the fixtures 272b, 274b, 276a fixed to the inner seat tracks 284a and 282b.

This W2 is the width between the seats on the corresponding aisle side, and may be equal to or greater than the dimension (for example, 51 cm) defined by regulation. These calculation operations are calculated for the front row seat to the rearmost seat of the aircraft airframe, and there are no problems provided that the width between all of the aisle side seats is greater than or equal to the width defined by regulation.

It should be noted that, although legal regulations do not stipulate the interval on the window side, by obtaining the dimension between the corresponding seat track and the window side from the structural design document of the airframe, it is possible to ensure an appropriate interval on the window side as well.

Next, a manufacturing process for implementing the first embodiment and a process for attaching a seat unit to an aircraft airframe will be described. The seat unit structure used in the first embodiment is integrally formed from thermoplastic resins such as polyetherimide or polyetherketoneketone, thermosetting resins capable of appropriately controlling flammability, or members formed from composite materials such as carbon graphite fiber, glass fiber, or aramid fiber to which core materials such as foam or honeycomb are combined as necessary.

There are two types of methods for attaching a seat unit such as this to an aircraft airframe. One is a method of attaching seat components including the seat to seat unit structure, and attaching the substantially completed seat unit to the aircraft airframe. The other attachment method is a method of attaching seat components including the seat after a structure such as a seat unit has been attached to the aircraft airframe.

Operational Advantage

According to the first embodiment, as the seat unit structure (shell 20) is connected and fixed to the aircraft at the bottom of the seat base 240 and defines the outermost shell of the seat unit, even when the seat components are attached, this does not increase the width on the aisle side. As a result, it is possible to determine the aisle width at a stage prior to attaching the seat unit to the aircraft airframe. In addition, even if the seat components are attached after the seat unit structure is connected and fixed to the aircraft, the predetermined aisle width does not change, and seat components do not need to be reinstalled.

In addition, with respect to the interval between the seat unit and the window side, as well, similar to the case of the adjacent seat units, the interval can be determined in advance at a stage prior to attaching the seat units to the aircraft airframe.

Further, according to the first embodiment, the seat unit can be attached with a high degree of freedom without being influenced by the position of the seat track. In addition to this, in the first embodiment, since the angle at which the seat unit is attached to the seat track and the aisle width that can be secured thereby can be easily confirmed, the design of seat arrangements on the aircraft can easily be carried out.

Furthermore, regardless of the position of the seat track, a large space can be secured at the feet area, and this has the effect of allowing the passenger to extend his or her legs wherever he or she pleases.

Furthermore, in the aircraft manufacturing process, it becomes possible for the process of manufacturing and installing the seat unit structure and the process of manufacturing and installing the seat components including the seat to be completely separated and performed by separate operators as separate processes. In addition, in the case that the aircraft body manufacturer develops and provides seat unit structures, the seat manufacturer can easily perform the test certification for the seat base, which has the effect of shortening the development period.

Second Embodiment

Figure 11:
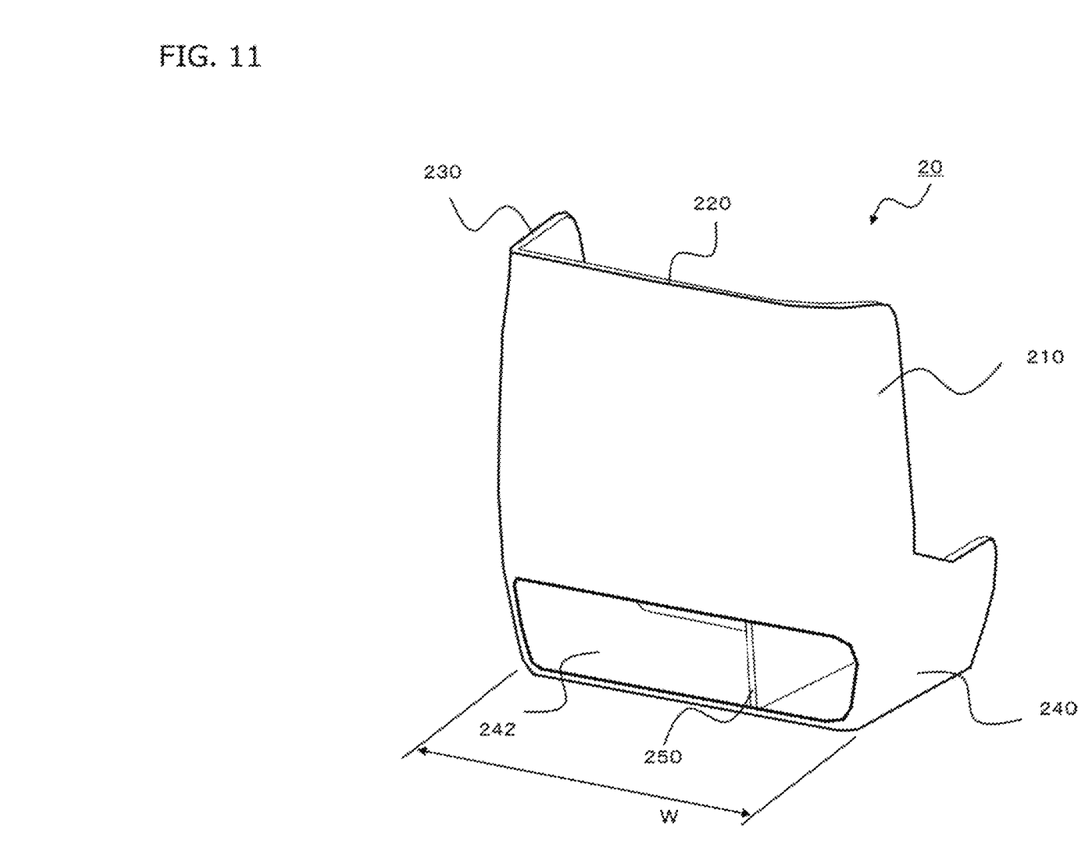
FIG. 11 is a rear perspective view of a seat unit structure according to a second embodiment.

Next, a second embodiment will be described with reference to FIG. 11. FIG. 11 illustrates a seat unit structure (shell 20) that integrally molds the seat base 240 and the upper shell described in the first embodiment. Except for the fact that the seat base 240 and the upper shell are integrally molded together, the configuration is the same as the first embodiment.

Configuration

In the second embodiment, the seat base 240 and the upper shell are integrally molded together to realize an integrated monocoque structure. The maximum width dimension W, the composite material and the like used for the integrally molded members are also the same as in the first embodiment.

Operational Advantage

According to the second embodiment, the same advantages as those of the first embodiment can be obtained, and further, the operation of combining the outermost shell of the seat base 240 and the outermost shell of the upper shell becomes unnecessary.

In addition, since the seat base and the upper shell are integrated, the overall strength of the seat can be improved. In addition, the attachment operation can be simplified.

Third Embodiment

Figure 12:
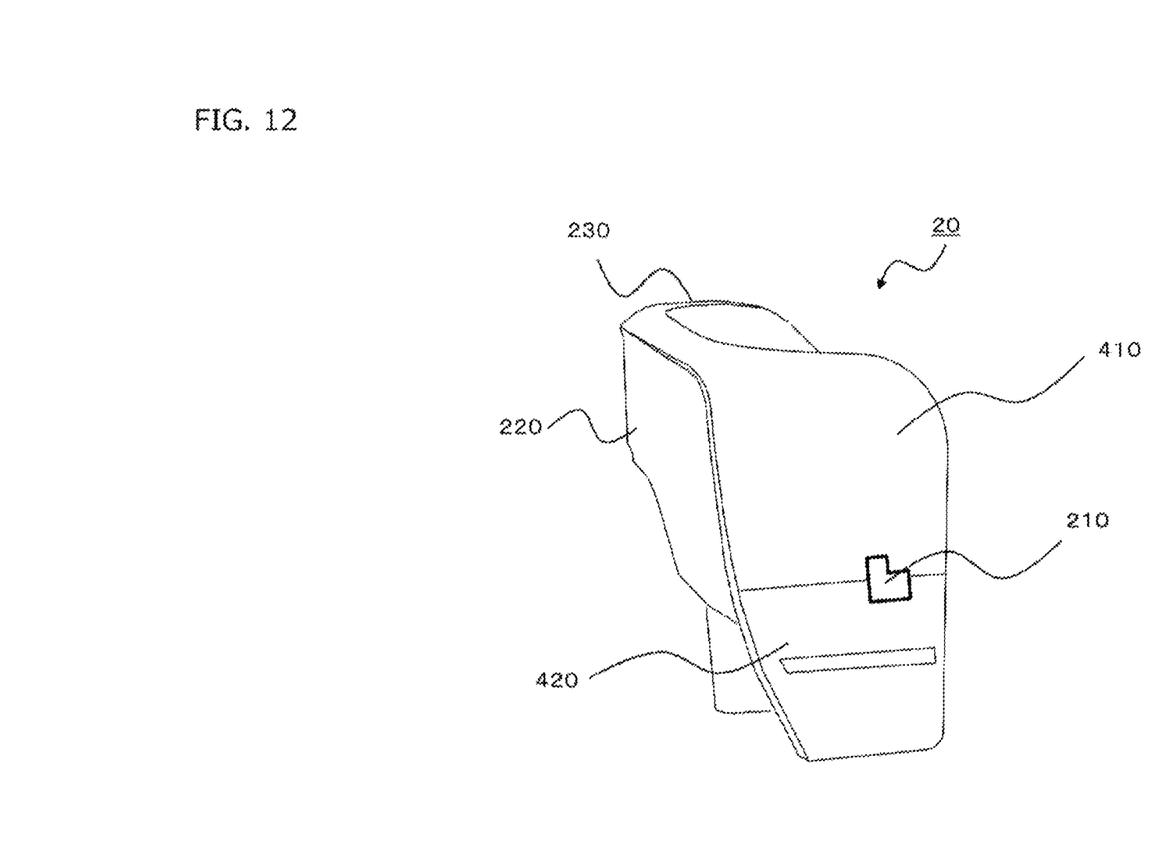
FIG. 12 is a perspective view of an ornamented seat unit structure according to a third embodiment.

Next, a third embodiment will be described with respect to FIG. 12. FIG. 12 is a perspective view illustrating an ornamented seat unit structure (shell 20). In addition to the right side shell 210, the rear side shell 220, and the left side shell 230 described in the first embodiment, the shell 20 includes a protective cover 410 that protects from the upper surface to both side surfaces of the shell, and an end surface cover 420 that protects the end surface of the shell. That is, the buffer members/ornamental members (the buffer members and/or the ornamental members) are provided on the outer surface of the seat unit structure.

Since passengers or flight attendants may come into contact with the shell 20 when they walk in the aisle, the shell 20 is formed of a soft material such as rubber or sponge, and protects passengers or flight attendants from coming into direct contact with the composite materials such as the hard thermoplastic resin, thermosetting resin, or carbon graphite constituting the shell 20. Further, the end surface cover 420 is configured to prevent the cart for transporting food or the like from coming into direct contact with the hard material constituting the shell 20, and covers not only the right side shell 210 but also the lower end of the left side shell 230.

In the case of the third embodiment, in addition to the right side shell 210 and the left side shell 230, the protective cover 410 and the end surface cover 420 define the maximum width dimension outermost shell of the seat unit from the seat unit.

In addition, the protective cover 410 and the end surface cover 420 also have a function of ornamenting the shell 20 integrally formed of the composite materials. Alternatively, the shell 20 may be painted directly and covered with a transparent protective cover 410 and an ornamental cover 420 at the end surface.

In addition, a display may be installed on the rear side shell 220. Alternatively, a storage compartment, a socket, a cosmetic mirror, or the like for usage by the person sitting in the rear seat may be arranged.

Operational Advantage

According to the third embodiment, the same advantages as those of the first embodiment can be obtained, and passengers, flight attendants, carts, or the like can be prevented from directly coming into contact with the hard materials constituting the shell 20.

In addition, unifying the ornaments of the protective cover 410 and the end surface cover 420 of the seats of the aircraft has the effect of helping to improve the brand appeal of each airline.

Although the present invention has been described in terms of an example applied to the above-described seat units of an aircraft, the subject of the present invention is not limited to aircraft, and may be also be applied to the seats of various mobile bodies other than aircraft, including various modifications. For example, the present invention can also be suitably used for other types of vehicles, such as trains, long-distance buses, and passenger ships, as well as water transport systems including ferries and hovercraft.

In addition, the above-described embodiments are described in detail in order to explain the present invention in an easy-to-understand manner, and are not necessarily limited to include all of the described configurations. Also, a portion of the configuration of one embodiment can be replaced with the configuration of another embodiment, and the configuration of one embodiment can be added to the configuration of another embodiment. Further, it is possible to add, delete, or replace a portion of one configuration with a portion of the configuration of another embodiment.

REFERENCE SIGNS LIST

1 Seat unit
10 Seat
20 Shell
110 Lower seat
120 Upper seat
130 Headrest
140 Legrest
150 Seatbelt
160 Upper seat support structure
170 Reinforcing member
180 Seat reclining mechanism
190 Foot reclining mechanism
210 Right side shell
220 Rear side shell
230 Left side shell
240 Seat base
242 Hollow region
244 Inner surface
246 Outer surface
247 Recess
248 Honeycomb structure
250 Partition member
260 Mounting block
262 First mounting block
264 Second mounting block
266 Third mounting block 270 Fixture
272 First fixture
274 Second fixture
276 Third fixture
280 Seat track
282 First seat track
284 Second seat track
286 Underfloor structure
287 Flat portion
288 Seat track side fitting portion
290 Track fitting member
291 Fitting side fitting portion
292 Vertical spring
293 Plunger
294 Bolt
295 Nut
297 Right side buffer member
298 Left side buffer member
310 Right armrest portion
320 Left armrest portion
330 Storage box
340 Ottoman
350 Jack
360 Reading light
410 Protective cover
420 End surface cover

The invention claimed is:

1. A seat unit structure comprising:
a lower structure having a bottom surface portion; and
an upper shell installed above the lower structure,
wherein
the seat unit structure forms part of a seat unit;
the seat unit is provided with one or more seat components;
the seat unit structure defines an outermost shell of the seat unit in at least one direction of the seat unit such that all seat components provided with the seat unit are accommodated in an inner region of the seat unit structure,
the lower structure connects and fixes the seat unit to a pair of seat tracks of a mobile body at the bottom surface portion;
the bottom surface portion includes a first fixture, a second fixture, and a third fixture; and
the first and second fixtures are attached to one of the pair of seat tracks, and the third fixture is attached to another of the pair of seat tracks at a corresponding location between the first fixture and the second fixture.

2. The seat unit structure according to claim 1, wherein the lower structure has a monocoque structure, and the one direction is a width direction of the mobile body.

3. The seat unit structure according to claim 1, wherein the lower structure and the upper shell are integrally formed.

4. The seat unit structure according to claim 2, wherein the lower structure and the upper shell are integrally formed.

5. The seat unit structure according to claim 1, wherein the seat unit structure includes a buffer member or an ornamental member on its outer surface.

6. The seat unit structure according to claim 2, wherein the seat unit structure includes a buffer member or an ornamental member on its outer surface.

7. The seat unit structure according to claim 3, wherein the seat unit structure includes a buffer member or an ornamental member on its outer surface.

8. A seat unit comprising:
a seat;
one or more seat components; and
a seat unit structure configured to support the seat,
wherein:
the seat unit structure includes:
a lower structure having a bottom surface portion; and
an upper shell installed above the lower structure,
the seat unit structure defines an outermost shell of the seat unit in at least one direction of the seat unit such that all seat components provided with the seat unit are accommodated in an inner region of the seat unit structure,
the lower structure connects and fixes the seat unit to a pair of seat tracks of a mobile body at the bottom surface portion;
the bottom surface includes a first fixture, a second fixture, and a third fixture; and
the first and second fixtures are attached to one of the pair of seat tracks, and the third fixture is attached to another of the pair of seat tracks at a corresponding location between the first fixture and the second fixture.

9. A seat attachment method comprising:
connecting and fixing a seat unit structure to a mobile body; and
installing a necessary seat for a seat unit in the seat unit structure,
wherein:
the seat unit structure includes:
a lower structure having a bottom surface portion; and
an upper shell installed above the lower structure,
the seat unit is provided with one or more seat components;
the seat unit structure defines an outermost shell of the seat unit in at least one direction of the seat unit such that all seat components provided with the seat unit are accommodated in an inner region of the seat unit structure, and
the lower structure connects and fixes the seat unit to a pair of seat tracks of a mobile body at the bottom surface portion;
the bottom surface portion includes a first fixture, a second fixture, and a third fixture; and
the first and second fixtures are attached to one of the pair of seat tracks, and the third fixture is attached to another of the pair of seat tracks at a corresponding location between the first fixture and the second fixture.

10. The seat unit structure according to claim 1, wherein:
the seat component is selected from the group consisting of a headrest and an armrest.

* * * * *